United States Patent
Bungert et al.

(10) Patent No.: US 10,187,259 B2
(45) Date of Patent: Jan. 22, 2019

(54) BANDWIDTH ALLOCATION

(71) Applicant: Hewlett-Packard Development Company, L.P., Houston, TX (US)

(72) Inventors: Daniel Bungert, Fort Collins, CO (US); Daryl T. Poe, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 135 days.

(21) Appl. No.: 15/219,815

(22) Filed: Jul. 26, 2016

(65) Prior Publication Data
US 2018/0034702 A1 Feb. 1, 2018

(51) Int. Cl.
*H04L 29/08* (2006.01)
*H04L 12/24* (2006.01)

(52) U.S. Cl.
CPC ............... *H04L 41/0896* (2013.01)

(58) Field of Classification Search
CPC .................................... H04L 41/0896
USPC ........................................ 709/226
See application file for complete search history.

(56) References Cited

U.S. PATENT DOCUMENTS

| | | | |
|---|---|---|---|
| 6,754,700 B1* | 6/2004 | Gordon | G06F 17/30899 370/231 |
| 2004/0185775 A1* | 9/2004 | Bell | H04B 7/18515 455/12.1 |
| 2011/0307538 A1 | 12/2011 | Rimac et al. | |
| 2014/0215001 A1 | 7/2014 | Tucek et al. | |
| 2016/0037509 A1 | 2/2016 | Tiger et al. | |
| 2016/0095017 A1 | 3/2016 | Ely et al. | |
| 2018/0026866 A1* | 1/2018 | Williams | H04L 47/822 |

OTHER PUBLICATIONS

F5 Networks, Inc., "Bandwidth Management for Peer-to-peer Applications", Dec. 14, 2007, 15 pages.
Eriksen, Marius A., "Trickle: A Userland Bandwidth Shaper for Unix-like Systems", marius@monkey.org, 10 pages.

* cited by examiner

*Primary Examiner* — Adnan M Mirza
(74) *Attorney, Agent, or Firm* — Brooks, Cameron & Huebsch PLLC

(57) ABSTRACT

Example implementations relate to bandwidth allocation. For example, a system for bandwidth allocation may include a first computing device in communication with an intermediary device and a host. The first computing device may monitor an amount of bandwidth consumed by the first computing device and alter an amount of bandwidth received to the first computing device in response to the amount of bandwidth consumed by the first computing device changing.

14 Claims, 3 Drawing Sheets

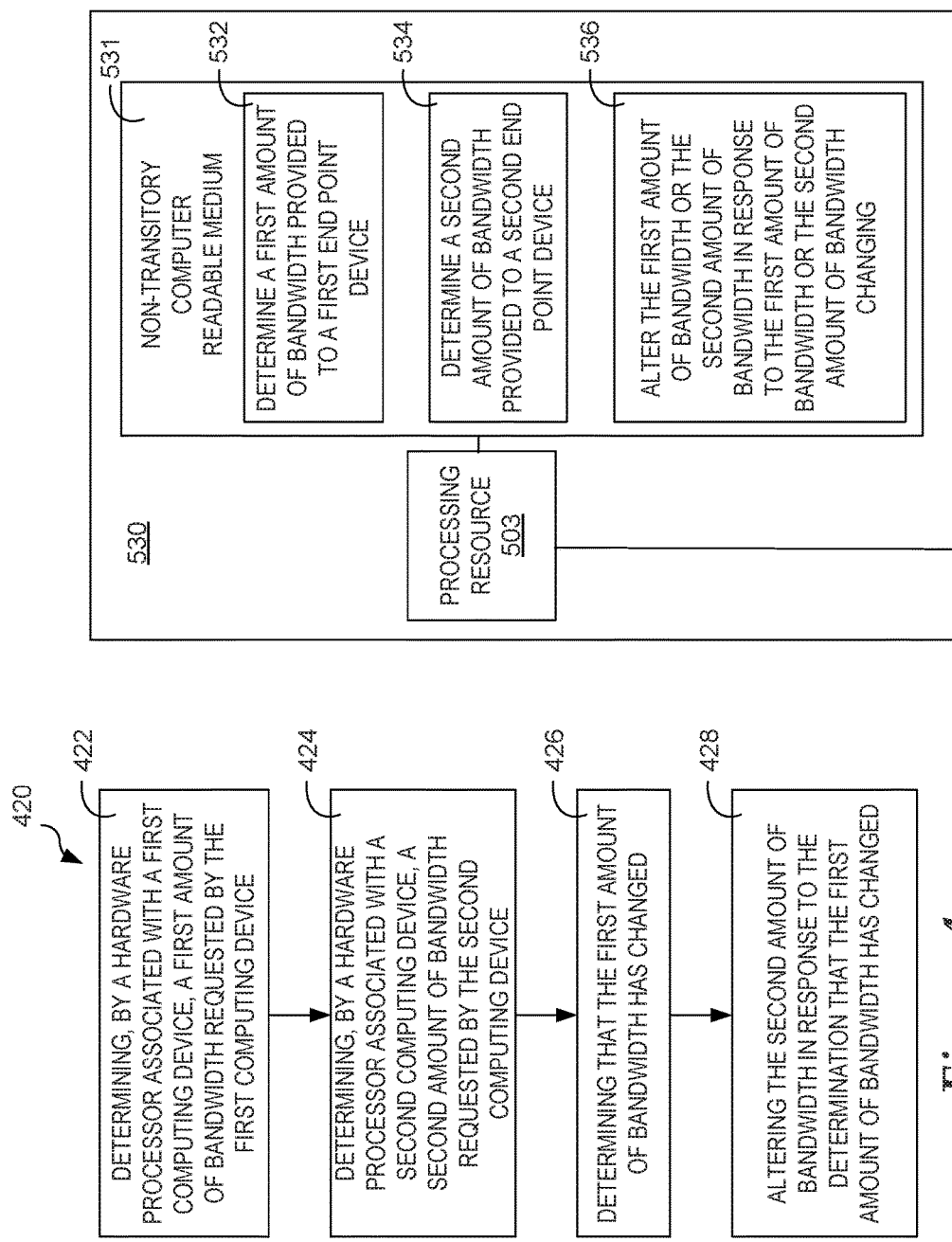

BANDWIDTH ALLOCATION

BACKGROUND

Computing devices and/or applications associated with a network may have an amount of bandwidth associated therewith. The amount of bandwidth allocated to one or more computing devices and/or applications associated with a network may be restricted and/or re-allocated amongst the one or more computing devices and/or applications.

BRIEF DESCRIPTION OF THE DRAWINGS

FIG. 4 illustrates a flow diagram for an example method for bandwidth allocation consistent with the disclosure.

FIG. 5 illustrates a diagram of an example of a non-transitory computer readable medium and processing resource for bandwidth allocation consistent with the disclosure.

DETAILED DESCRIPTION

Figure 1:
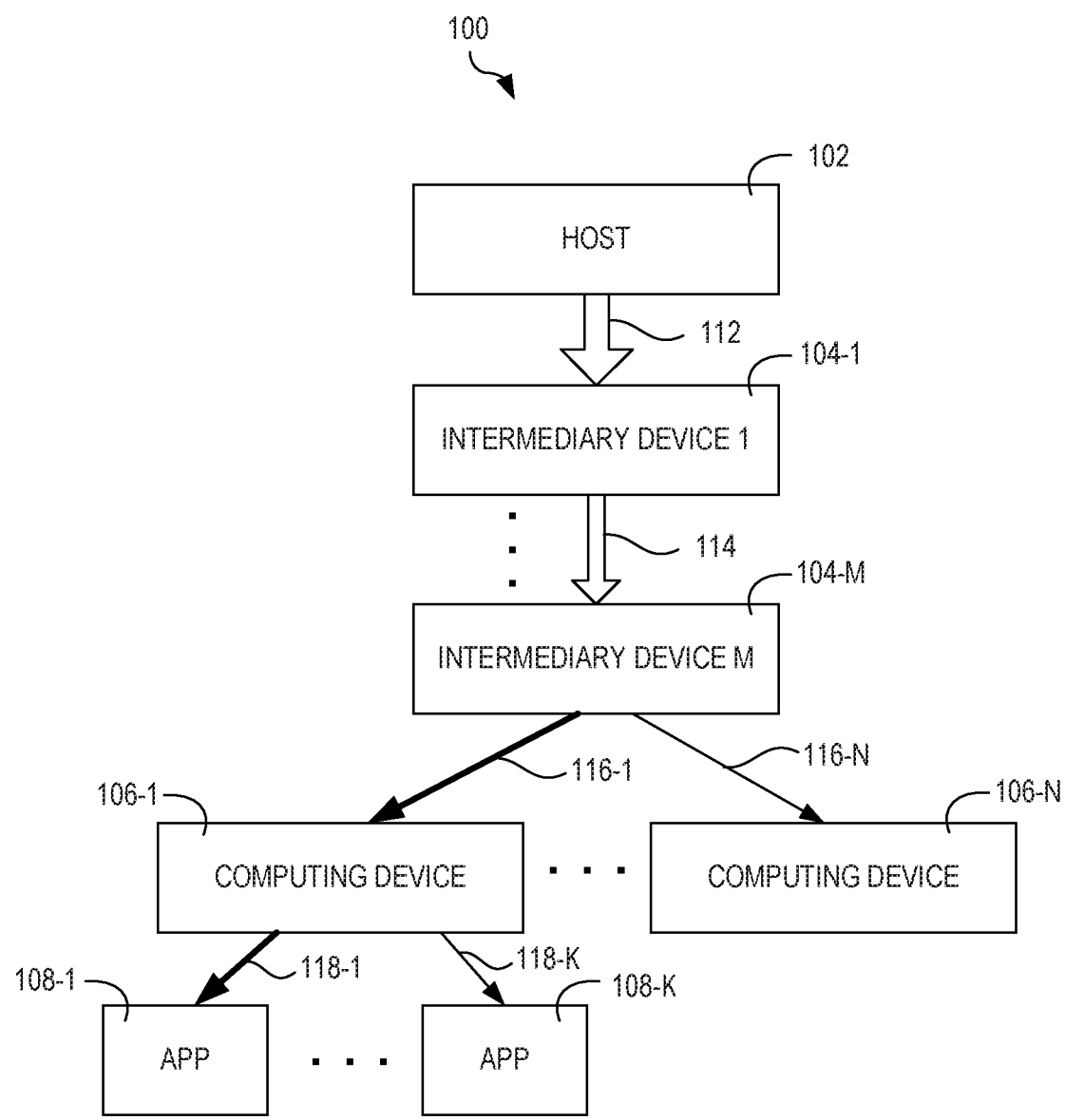
FIG. 1 illustrates a diagram of an example of a system for bandwidth allocation consistent with the disclosure.

Computer networks can include various components that allow for computers to exchange data over wired and/or wireless transmission media. For example, a computer network may include one or more hosts (e.g., servers) in communication with one or more network nodes and/or computing devices. Non-limiting examples of network nodes include network interface controllers (NICs), repeaters, hubs, routers, modems, switches, etc., while non-limiting examples of computing devices include personal computers, laptops, personal digital assistants (PDAs), smartphones, tablets, phablets, etc.

In some examples, one or more intermediary devices may be provided as part of a computer network. For example, one or more intermediary devices may be positioned between the host(s) and the network nodes and/or computing devices. As used herein, an intermediary device is a networking device positioned between a remote access service (RAS) server and one or more computing devices. A non-limiting example of an intermediary device is a security host. In some examples, the intermediary device(s) may be in communication with the host and the one or more network nodes and/or computing devices.

An amount of data that may be exchanged in a computer network may be limited to an amount of bandwidth available in the computer network, or an amount of bandwidth available to a particular device (e.g., a network node, a computing device, etc.). For example, the bandwidth available to a particular device in the computer network may be limited by the type of internet connection the device is using. This may give rise to a bandwidth bottleneck. As used herein, a bandwidth bottleneck (or bottleneck) is a phenomenon where performance of a network is limited because not enough bandwidth is available to ensure that all data packets in the network reach their destination in a timely fashion. Bandwidth bottlenecks may give rise to slow and/or unresponsive applications, which can reduce effectiveness of the network, reduce productivity, and/or increase costs.

In some examples, an amount of bandwidth requested by a computer network, or portion thereof, may exceed an amount of bandwidth supplied to the computer network (or portion thereof), thereby giving rise to a bandwidth bottleneck. In an effort to alleviate bandwidth bottlenecks, some approaches include the use of techniques such as traffic shaping (e.g., bandwidth shaping). Traffic shaping may be implemented at a host, intermediary device, or network node; however, it may be impractical to implement traffic shaping at these locations in an environment where an administrator or user does not have control over the host, intermediary device, or network node. In contrast, in some examples, traffic shaping techniques may be implemented from a computing device to reduce and/or allocate data traffic in a computer network.

Examples of the present disclosure include methods, systems, and computer-readable media storing executable instructions for bandwidth allocation. For example, methods, systems, and computer-readable media storing executable instructions that may allow for bandwidth allocation in a computer network are described herein. In some examples, a system for bandwidth allocation may include a first computing device in communication with an intermediary device and a host. The first computing device may monitor an amount of bandwidth consumed by the first computing device and alter an amount of bandwidth received to the first computing device in response to the amount of bandwidth consumed by the first computing device changing.

In some examples, the first computing device may send an overloaded network function call to the intermediary device to alter the amount of bandwidth received to the first computing device. In some examples, the first computing device may monitor an amount of bandwidth requested by each of a plurality of applications running on the first computing device, determine that at least one application among the plurality of applications is using less than a threshold bandwidth allocation associated with the at least one application among the plurality of applications, and re-allocate bandwidth from the at least one application among the plurality of applications to a different application among the plurality of applications based on the determination that the at least one application among the plurality of applications is using less than the threshold bandwidth allocation associated with the at least one application among the plurality of applications.

In some examples, the system may include a second computing device in communication with the first computing device and the intermediary device. The second computing device may determine an amount of bandwidth requested by the second computing device, receive an indication from the first computing device, the indication comprising an amount of bandwidth requested by the first computing device, and re-allocate bandwidth from the first computing device to the second computing device in response to the indication indicating that the first computing device is using less than a threshold bandwidth allocation associated with the first computing device.

FIG. 1 illustrates a diagram of an example of a system according to the present disclosure. As shown in the example of FIG. 1, the system 100 may include a host 102 accessible by and in communication with one or more intermediary devices 104-1, . . . , 104-N. At least one intermediary device (e.g., intermediary device M 104-M) may be in communication with a plurality of computing devices computing device 106-1, computing device 106-N, etc.). At least one computing device (e.g., computing device 106-1) may be in communication with a plurality of applications ("APP(s)")

APP 108-1, APP 108-K, etc. In some examples, the computing devices 106-1, . . . , 106-N may be end point devices.

The components (e.g., host 102, intermediary devices 104-1, . . . , 104-M, computing devices 106-1, . . . , 106-N, bookkeepers 310, etc.) of the system 100 may include hardware, e.g., in the form of transistor logic and/or application specific integrated circuitry (ASICs), firmware, and software, e.g., in the form of machine readable and executable instructions (program instructions (programming) stored in a machine readable medium (MRM)) which in cooperation may form a computing device. The components of the system 100 may include a combination of hardware and software (e.g., program instructions), but at least hardware that is configured to perform particular functions, tasks and/or actions. In some examples, one or more components of the system 100 may include non-transitory computer readable medium in communication with a processing resource, as described in more detail in connection with FIG. 5, herein.

As shown in FIG. 1, the host 102 may be in communication with a first intermediary device 104-1 via transmission medium 112. As used herein, transmission mediums include wired or wireless communication channels. For example, transmission mediums may include un-shielded twisted pairs (UTP), shielded twisted pairs, coaxial cable(s), optical fiber(s), radio transmission(s), microwave transmission(s), etc. The first intermediary device 104-1 may be in communication with a plurality of intermediary devices (e.g., intermediary device 104-M) via one or more transmission mediums 114. Although FIG. 1 shows only a single transmission medium 112 between the host 102 and the first intermediary device 104-1, and only a single transmission medium 114 between the first intermediary device 104-1 and the $M^{th}$ intermediary device 104-M, it will be understood by one of ordinary skill in the art that a plurality of transmission mediums may be provided between host 102 and the intermediary devices 104-1, . . . , 104-M, as well as between the intermediary devices 104-1, . . . , 104-M. The relative thickness of the arrows used in FIGS. 1-3 to indicate transmission mediums (e.g., 112, 114, 116-1, . . . , 116-N, 118-1, . . . , 118-K) is meant to indicate that an amount of bandwidth requested, or received, by the various devices in the system 100 may be different. However, as will be appreciated, each device in the system 100 may request and/or receive data across varying bandwidths.

At least one intermediary device (e.g., intermediary device 104-M) may be in communication with a plurality of computing devices 106-1, . . . , 106-N. For example, intermediary device 104-M may be in communication with a plurality of computing devices 106-1, . . . , 106-N via transmission media 116-1, . . . , 116-N. For purposes of illustration, transmission media 116-1 is indicated by a thicker line than transmission media 116-N to indicate that an amount of bandwidth requested, or received, by computing devices 106-1 through 106-N may differ between different computing devices 106-1, . . . , 106-N. In some examples, the various transmission media 112, 114, 116-1, . . . , 116-N may represent locations where a bandwidth bottleneck may occur and/or a bandwidth limit associated with data transmission to and/or from the respective component of the system 100.

In the example of FIG. 1, computing device 1 106-1 is shown as being in communication with a plurality of APPs 108-1, . . . , 108-K. For clarity, APP 108-1—APP 108-K are shown as being in communication only with computing device 106-1; however, as will be appreciated, each end point device among the plurality of computing devices 106-1, . . . , 106-N may be in communication with its own respective applications. Each respective APP of the plurality of APPs 108-1, . . . , 108-K may provide a different and/or unique functionality to computing device 106-1.

In some examples, bandwidth allocation may be performed with respect to a single computing device (e.g., computing device 106-1). In this example, the computing device 106-1 may include a preloaded, shared library that may be operable to override the behavior of existing instructions (e.g., programming instructions) associated with the network. As used herein, a preloaded, shared library is one or more files that may be shared by executable files associated with components of the computing network. In addition, a preloaded, shared library may be preloaded on to the components associated with the network prior to the component being powered on. In some examples, by using the preloaded, shared library, it may be possible to override the behavior of existing instructions associated with the network without having to recompile instructions associated with the network and/or operating system libraries.

In some examples, the preloaded, shared library can include one or more overloaded network function calls. As used herein, overloaded network function calls are network function calls that specify more than one function of the same name and in the same scope. For example, function calls that include different semantics for a particular function may be said to be overloaded network function calls. In some examples, the overloaded network function call may intercept "real" network calls that are made from one or more network nodes and/or computing devices to an operating system associated with the network.

Although not shown in FIG. 1, a configuration system may be included in system 100. The configuration system may determine a threshold and/or maximum allowed bandwidth to be consumed by the computing device(s) 106 and/or an APP 108-1, . . . , 108-K. In some examples, the overloaded network function calls may communicate with the configuration system to determine the threshold and/or maximum allowed bandwidth to be consumed by the computing device(s) 106, and may operate to slow down the disbursement of incoming and/or outgoing data. In some examples, the overloaded network function calls and the configuration system may be in communication to slow the disbursement of incoming data regardless of whether or not the computing device(s) 106 has additional bandwidth available.

In some examples, this may result in a bandwidth bottleneck, which may, in turn, trigger transmission control protocol (TCP) congestion-avoidance. TCP congestion-avoidance may allow for the host 102 to determine that a bandwidth bottleneck has developed sooner than if the bandwidth bottleneck was allowed to develop on its own, for example, in the absence of overloaded network function calls. In some examples, providing overloaded network function calls may reduce the amount of data consuming bandwidth at the computing device(s) 106, and may therefore yield a more consistent flow of data to and/or from the computing device(s) 106.

Figure 2:
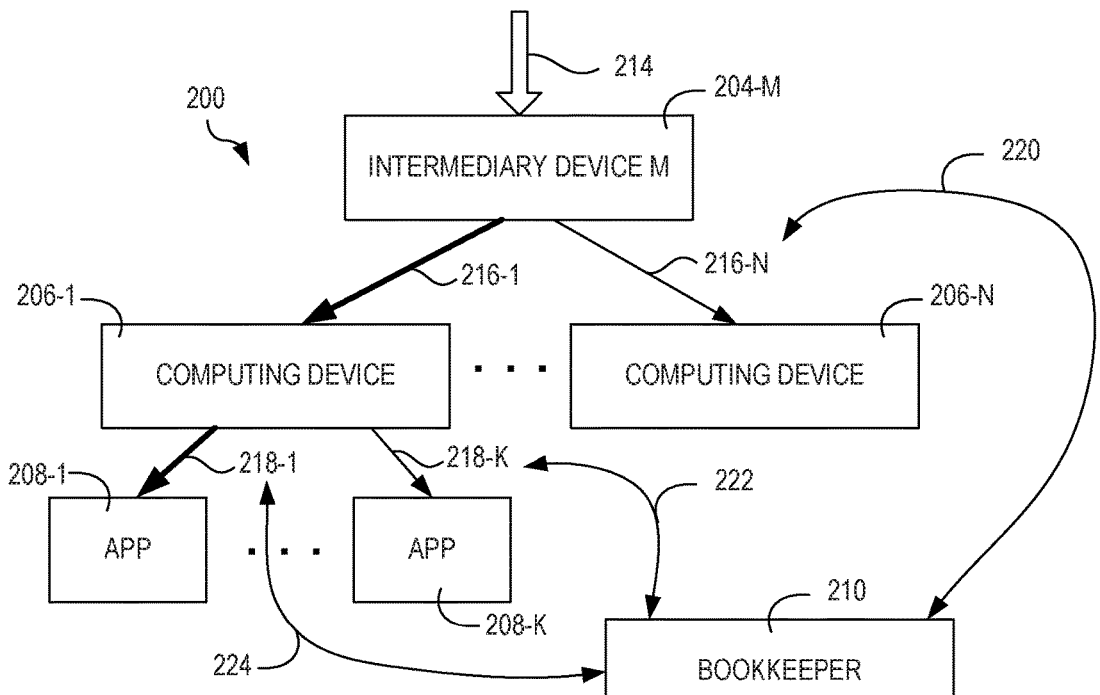
FIG. 2 illustrates another diagram of an example of a system for bandwidth allocation consistent with the disclosure.

FIG. 2 illustrates another diagram of an example of a system for bandwidth allocation consistent with the disclosure. As shown in FIG. 2, at least one intermediary device (e.g., intermediary device 204-M) may be in communication with a plurality of computing devices 206-1, . . . , 206-N. For example, intermediary device 204-M may be in communication with a plurality of computing devices 206-1, . . . , 206-N via transmission media 216-1, . . . , 216-N. For purposes of illustration, transmission media 216-1 is indicated by a thicker line than transmission media 216-N to indicate that an amount of bandwidth requested, or received, by computing device(s) 206 may differ between different computing device(s) 206. In sonic examples, the various transmission media 212, 214, 216-1, . . . , 216-N may represent locations where a bandwidth bottleneck may occur and/or a bandwidth limit associated with data transmission to and/or from the respective component of the system 200.

In the example of FIG. 2, computing device 206-1 is shown as being in communication with a plurality of APPs 208-1, . . . , 208-K. For clarity, APP 208-1—APP 208-K are shown as being in communication only with computing device 206-1; however, as will be appreciated, each end point device among the plurality of computing devices 206-1, . . . , 206-N may be in communication with its own respective applications. Each respective APP of the plurality of APPs 208-1, . . . , 208-K may provide a different and/or unique functionality to computing device 206-1.

As shown in FIG. 2, a bookkeeper 210 may monitor bandwidth usage, as indicated by arrows 220, 222, and 224, among applications using one or more overloaded network function calls. For clarity, a line is not shown between bookkeeper 210 and transmission medium 216-1; however, such a communication path is contemplated by the present disclosure. In some examples, the bookkeeper 210 may facilitate an overall network bandwidth disbursement that is at or below a bandwidth allocation associated with the computing device(s) 206. As used herein, a bookkeeper 210 refers to hardware, programming instructions and/or logic to monitor and/or allocate bandwidth amongst the computing devices 206 and/or APPs 208. For example, the bookkeeper 210 may be any combination of hardware and programming instructions to perform a number of functions described herein. The hardware may, for example, include a processing resource and a memory resource (e.g., computer or machine readable medium (CRM/MRM), database, etc.). A processing resource, as used herein, may include one or more processors capable of executing instructions stored by the memory resource. The processing resource may be implemented in a single device or distributed across multiple devices. The program instructions (e.g., computer or machine readable instructions (CRI/MRI)) may include instructions stored on the memory resource and executable by the processing resource to perform a particular function, task and/or action (e.g., monitor bandwidth usage, re-allocate bandwidth usage, etc.).

In some examples, bookkeeper 210 may limit bandwidth allocation among APP(s) 208 and/or computing device(s) 206. For example, bookkeeper 210 may determine that a particular APP (e.g., APP 208-1) may require more bandwidth than another APP (e.g., APP 208-K), and bookkeeper 210 may re-allocate bandwidth to APP 208-1 in response to the determination that APP 208-1 requires more bandwidth. In some examples, bookkeeper 210 may re-allocate bandwidth from APP 208-K to APP 208-1 in response to a determination that APP 208-K would still have enough bandwidth to perform its function even if bandwidth is re-allocated from APP 208-K to APP 208-1.

In some examples, bookkeeper 210 may allocate bandwidth among all APP(s) 208 and/or computing device(s) 206 such that bandwidth is allocated equally among each APP 208-1, . . . , 208-K and/or each computing device 206-1, . . . , 206-N. However, in some examples, bookkeeper 210 may re-allocate bandwidth between APP(s) 208 and/or computing device(s) 206 dynamically based, at least in part, on changing bandwidth usage in the network.

Figure 3:
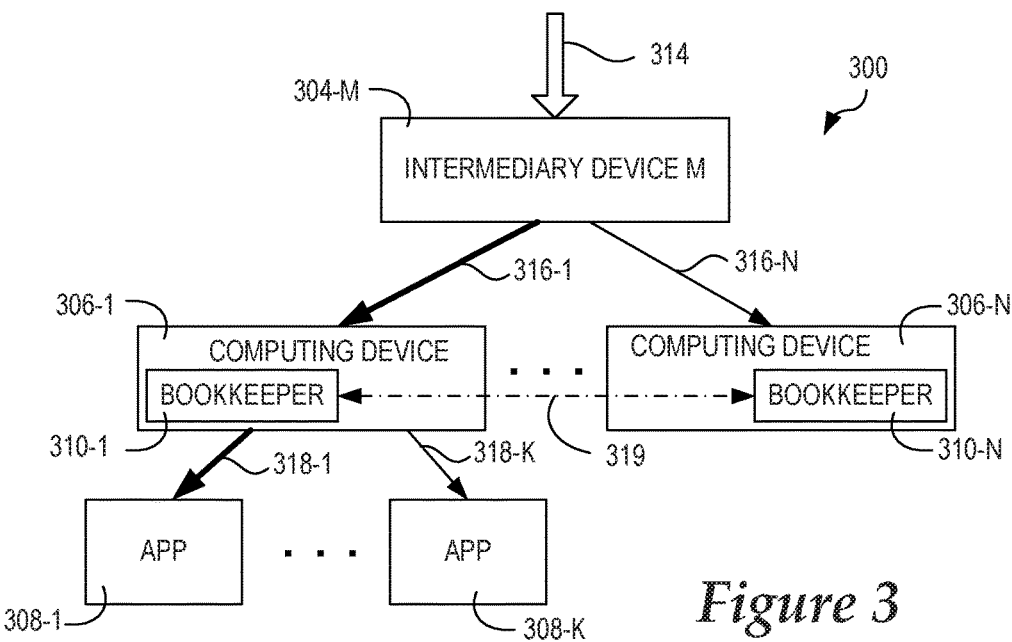
FIG. 3 illustrates another diagram of an example of a system for bandwidth allocation consistent with the disclosure.

FIG. 3 illustrates another diagram of an example of a system for bandwidth allocation consistent with the disclosure. As shown in FIG. 3, at least one intermediary device (e.g., intermediary device 304-M) may be in communication with a plurality of computing devices 306-1, . . . , 306-N. For example, intermediary device 304-M may be in communication with a plurality of computing devices 306-1, . . . , 306-N via transmission media 316-1, . . . , 316-N. For purposes of illustration, transmission media 316-1 is indicated by a thicker line than transmission media 316-N to indicate that an amount of bandwidth requested, or received, by computing device(s) 306 may differ between different computing device(s) 306. In some examples, the various transmission media 312, 314, 316-1, . . . , 316-N may represent locations where a bandwidth bottleneck may occur.

In the example of FIG. 3, computing device 306-1 is shown as being in communication with a plurality of APPs 308-1, . . . , 308-K. For clarity, APP 308-1—APP 308-K are shown as being in communication only with computing device 306-1; however, as will be appreciated, each end point device among the plurality of computing devices 306-1, . . . , 306-N may be in communication with its own respective applications. Each respective APP of the plurality of APPs 308-1, . . . , 308-K may provide a different and/or unique functionality to computing device 306-1.

As shown in FIG. 3, a plurality of bookkeepers 310-1, . . . , 310-N may be associated with one or more computing devices 306 among a plurality of computing devices 306-1, . . . , 306-N. In some examples, one or more of the bookkeepers 310 may initially allocate bandwidth equally among the APP(s) 308 and/or computing device(s) 306. For example, if the system 300 includes ten computing devices and X bandwidth, each computing device may initially be allocated x/10 available bandwidth. In some examples, particularly where each computing devices 306-1, . . . , 306-N are consuming an equal amount of bandwidth, such an allocation of bandwidth may be sufficient; however, such evenly distributed allocation of bandwidth may be sub-optimal when the APP(s) 308 and/or computing device(s) 306 have different and/or changing bandwidth requirements.

In some examples, one or more bookkeepers 310-1, . . . , 310-N may provide peer-to-peer communication, as indicated by dashed line 319, between the computing device(s) 306 and/or APP(s) 308. The peer-to-peer communication 319 may be used to communicate and/or compare bandwidth allocations and/or requirements among the computing device(s) 306 and/or APP(s) 308. For example, the peer-to-peer communication 319, the bookkeeper(s) 310 may determine that a bandwidth consumption and/or requirement for one or more computing device(s) 306 and/or APP(s) 308 has changed (e.g., one or more of the computing device(s) 306 and/or APP(s) 308 is idle or currently has a lower bandwidth consumption than was previously allocated to it). In some examples, the bookkeeper(s) 310 may then re-allocate bandwidth among the computing device(s) 306 and/or APP(s) 308 such that each computing device(s) 306 and/or APP(s) 308 has an equal amount of bandwidth to use. Examples are not so limited; however, and the bookkeeper(s) 310 may re-allocate bandwidth among the computing device(s) 306 and/or APP(s) 308 such that some computing device(s) 306 and/or APP(s) 308 are allocated a higher portion of bandwidth than one or more of the other computing device(s) 306 and/or APP(s) 308. In some examples, this may allow for bandwidth allocation based on current requirements of the computing device(s) 306 and/or APP(s) 308.

Examples are not limited to the example systems shown in FIGS. 1-3, and the components of FIGS. 1-3 may be located in a single system or reside in separate distinct locations in a distributed network, cloud computing, enterprise service environment (e.g., Software as a Service (SaaS) environment), etc.

FIG. 4 illustrates a flow diagram for an example method 420 according to the disclosure. In various examples, the method 420 may be performed using the systems 100 shown in FIGS. 1-3 and/or the processing resource 503 and non-transitory computer readable medium 531 shown in FIG. 5. Examples are not, however, limited to these example systems, devices, processing resources and/or non-transitory computer readable media.

At 422, the method 420 can include determining, by a hardware processor associated with a first computing device, a first amount of bandwidth requested at the first computing device. For example, the first computing device may determine an amount of bandwidth allocated to it and/or may determine an amount of bandwidth required to continue receiving and/or transmitting data while limiting data loss.

At 424, the method 420 can include determining, by a hardware processor associated with a second computing device, a second amount of bandwidth requested at a second computing device. For example, the second computing device may determine an amount of bandwidth allocated to it and/or may determine an amount of bandwidth required to continue receiving and/or transmitting data while limiting data loss.

At 426, the method 420 can include determining that the first amount of bandwidth requested has changed. In some examples, determining that the first amount of bandwidth has changed can include receiving an indication at the second computing device that the first amount of bandwidth has decreased. Determining that the first amount of bandwidth has changed can include receiving an indication at the second computing device that the first amount of bandwidth has increased.

At 428, the method 420 can include altering the second amount of bandwidth in response to the determination that the first amount of bandwidth requested has altered. In some examples, altering the second amount of bandwidth can include increasing the second amount of bandwidth in response to the indication that the first amount of bandwidth has decreased and/or decreasing the second amount of bandwidth in response to the indication that the first amount of bandwidth has increased.

In some examples, the method 420 may include storing the first amount of bandwidth requested on the first computing device and/or storing the second amount of bandwidth requested on the second computing device. The method 420 may further include comparing the first amount of bandwidth and the second amount of bandwidth. In some examples, the method 420 may include re-allocating the first amount of bandwidth and the second amount of bandwidth between the first computing device and the second computing device such that first amount of bandwidth is equal to the second amount of bandwidth.

FIG. 5 illustrates a diagram of an example system 530 including a processing resource 503 and non-transitory computer readable medium 531 according to the present disclosure. For example, the system 530 may be an implementation of the example systems of FIGS. 1-3 or the example method of FIG. 4.

The processing resource 503 may execute instructions stored on the non-transitory computer readable medium 531. The non-transitory computer readable medium 531 may be any type of volatile or non-volatile memory or storage, such as random access memory (RAM), flash memory, read-only memory (ROM), storage volumes, a hard disk, or a combination thereof.

The example medium 531 may store instructions 532 executable by the processing resource 603 to determine a first amount of bandwidth provided to a first end point device. For example, the instructions 532 may be executable to determine an amount of bandwidth allocated to the first end point device and/or may determine an amount of bandwidth required to continue receiving and/or transmitting data while limiting data loss.

The example medium 531 may further store instructions 534. The instructions 534 may be executable to determine a second amount of bandwidth provided to a second end point device. For example, the instructions 534 may be executable to determine an amount of bandwidth allocated to the second end point device and/or may determine an amount of bandwidth required to continue receiving and/or transmitting data while limiting data loss.

The example medium 531 may further store instructions 536. The instructions 536 may be executable to alter the first amount of bandwidth or the second amount bandwidth in response to the first amount of bandwidth or the second amount of bandwidth changing.

In some examples, the example medium 531 may further store instructions that may be executable to send an indication comprising the first amount of bandwidth from the first end point device to the second end point device, receive an indication to the first end point device comprising the second amount of bandwidth, and alter the first amount of bandwidth based, at least in part on the indication, In some examples, the example medium 531 may further store instructions that may be executable to send an overloaded network function call from the first end point device to alter the first amount of bandwidth.

In some examples, the example medium 531 may further store instructions that may be executable to store information relating to the first amount of bandwidth, store information relating to the second amount of bandwidth, compare the first amount of bandwidth to the second amount of bandwidth, and/or re-allocate the first amount of bandwidth and the second amount of bandwidth based, at least in part, on the comparison of the first amount of bandwidth and the second amount of bandwidth.

In the foregoing detailed description of the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, designators such as "N", "M", "K", etc., particularly with respect to reference numerals in the drawings, indicate that a number of the particular feature so designated can be included. As used herein, "a number of" a particular thing can refer to one or more of such things (e.g., a number of computing devices can refer to one or more computing devices). A "plurality of" is intended to refer to more than one of such things. Multiple like elements may be referenced herein generally by their reference numeral without a specific identifier at the end. For example, a plurality of computing devices 106-1, . . . , 106-N may be referred to herein generally as a plurality of computing devices 106.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, for example, various forms of transistor logic, application specific integrated circuits (ASICs), etc., as opposed to computer executable instructions, for example, software firmware, etc., stored in memory and executable by a processor.

What is claimed:

1. A system, comprising:
a first computing device in communication with an intermediary device and a host on a computing network, the first computing device to:
monitor an amount of bandwidth requested by the first computing device;
transmit, to a second computing device in communication with the first computing device, the intermediary device, and a host, an indication of the amount of bandwidth requested by the first computing device;
receive, from the second computing device, an indication of an amount of bandwidth requested by the second computing device;
in response to a comparison of the amount of bandwidth requested by the first computing device and the amount of bandwidth requested by the second computing device, send a false overloaded network function call from the first computing device to the intermediary device, despite the first computing device having access to additional available bandwidth, wherein the false overloaded network function call:
is a portion of a shared library of the first computing device that specifies a plurality functions of a same name and in a same scope,
intercepts a real network call made to an operating system associated with the computing network, and
slows a disbursement of incoming data to the first computing device without recompiling the existing bandwidth allocation instructions for the computing network; and
re-allocate bandwidth from the first computing device to the second computing device by overriding existing bandwidth allocation instructions for the computing network with the false overloaded network function call.

2. The system of claim 1, the first computing device to:
monitor an amount of bandwidth requested by each one of a plurality of applications running on the first computing device, wherein each one of the plurality of applications provides a distinct functionality to the first computing device;
determine that at least one application among the plurality of applications is using less than a threshold bandwidth allocation associated with the at least one application among the plurality of applications; and
re-allocate bandwidth from the at least one application among the plurality of applications to a different application among the plurality of applications based on the determination that the at least one application among the plurality of applications is using less than the threshold bandwidth allocation associated with the at least one application among the plurality of applications.

3. The system of claim 1, wherein the comparison includes an indication indicating that the first computing device is using less than a threshold bandwidth allocation associated with the first computing device.

4. The system of claim 3, wherein the first computing device and the second computing device are end point devices.

5. A method, comprising:
determining, by a hardware processor associated with a first computing device, a first amount of bandwidth requested by the first computing device;
determining, by a hardware processor associated with a second computing device, a second amount of bandwidth requested by a second computing device;
determining, by the hardware processor at the second computing device that the first amount of bandwidth requested is less than a threshold bandwidth allocation associated with the first computing device, based on an indication received at the second computing device from the first computing device;
in response to the determination that the first amount of bandwidth requested is less than the threshold bandwidth allocation associated with the first computing device, sending a false overloaded network function call from the first computing device, having access to additional available bandwidth, to an intermediary device, wherein the false overloaded network function call is a portion of a shared library of the first computing device that specifies a plurality functions of a same name and in a same scope and intercepts a real network call made to an operating system; and
reallocating, by the hardware processor at the second computing device, bandwidth from the first computing device to the second computing device by overriding existing bandwidth allocation instructions for the computing network with the overloaded network function call slowing a disbursement of incoming data to the first computing device without recompiling the existing bandwidth allocation instructions for the first computing device.

6. The method of claim 5, wherein the indication received at the second computing device includes an indication that the first amount of bandwidth has decreased.

7. The method of claim 6, wherein reallocating the bandwidth from the first computing device to the second computing device comprises increasing the second amount of bandwidth in response to the indication that the first amount of bandwidth has decreased.

8. The method of claim 5, comprising determining, based on an indication at the second computing device from the first computing device, that the first amount of bandwidth has increased.

9. The method of claim 8, comprising decreasing the second amount of bandwidth in response to the indication that the first amount of bandwidth has increased.

10. The method of claim 5, further comprising:
storing the first amount of bandwidth requested on the first computing device;
storing the second amount of bandwidth requested on the second computing device;
comparing the first amount of bandwidth and the second amount of bandwidth; and
re-allocating the first amount of bandwidth and the second amount of bandwidth between the first computing device and the second computing device such that first amount of bandwidth is equal to the second amount of bandwidth.

11. A non-transitory computer readable medium storing instructions executable by a processing resource to:
determine, at a first endpoint device in communication with a second endpoint device, a first amount of bandwidth provided to the first end point device;
determine, at the second endpoint device, a second amount of bandwidth provided to a second end point device;
send an indication comprising the second amount of bandwidth from the second end point device to the first end point device;
in response to a determination at the first endpoint device that the first amount of bandwidth or the second amount of bandwidth is less than a corresponding threshold bandwidth, send a false overloaded network function call from the first endpoint device, having access to additional available bandwidth, to an intermediary device, wherein the false overloaded network function call is a portion of a shared library of the first endpoint device that specifies a plurality functions of a same name and in a same scope and intercepts a real network call made to an operating system; and
reallocate, by the first endpoint device, the first amount of bandwidth away from the first endpoint device or the second amount bandwidth away from the second endpoint device by overriding existing bandwidth allocation instructions for the computing network with the overloaded network function call slowing a disbursement of incoming data to the first computing device without recompiling the existing bandwidth allocation instructions for the first computing device.

12. The non-transitory computer readable medium of claim 11, further storing instructions to:
send an indication comprising the first amount of bandwidth from the first end point device to the second end point device.

13. The non-transitory computer readable medium of claim 11, further storing instructions to:
send an overloaded network function call from the first end point device to alter the first amount of bandwidth.

14. The non-transitory computer readable medium of claim 11, further storing instructions to:
store information relating to the first amount of bandwidth;
store information relating to the second amount of bandwidth;
compare the first amount of bandwidth to the second amount of bandwidth; and
re-allocate the first amount of bandwidth and the second amount of bandwidth based, at least in part, on the comparison of the first amount of bandwidth and the second amount of bandwidth.

* * * * *